United States Patent
Shabtai et al.

(10) Patent No.: US 11,539,743 B2
(45) Date of Patent: Dec. 27, 2022

(54) ECHO DETECTION OF MAN-IN-THE-MIDDLE LAN ATTACKS

(71) Applicant: B. G. NEGEV TECHNOLOGIES AND APPLICATIONS LTD., Beer Sheva (IL)

(72) Inventors: Asaf Shabtai, Hulda (IL); Yisroel Avraham Mirsky, Nof Ayalon (IL); Naor Kalbo, Arad (IL); Yuval Elovici, Arugot (IL)

(73) Assignee: B. G. NEGEV TECHNOLOGIES AND APPLICATIONS LTD., Beer Sheva (IL)

(*) Notice: Subject to any disclaimer, the term of this patent is extended or adjusted under 35 U.S.C. 154(b) by 220 days.

(21) Appl. No.: 16/772,985

(22) PCT Filed: Dec. 13, 2018

(86) PCT No.: PCT/IL2018/051352
§ 371 (c)(1),
(2) Date: Jun. 15, 2020

(87) PCT Pub. No.: WO2019/116370
PCT Pub. Date: Jun. 20, 2019

(65) Prior Publication Data
US 2020/0396249 A1    Dec. 17, 2020

Related U.S. Application Data

(60) Provisional application No. 62/716,436, filed on Aug. 9, 2018, provisional application No. 62/597,945, filed on Dec. 13, 2017.

(51) Int. Cl.
*H04L 9/40*        (2022.01)
*H04L 43/50*       (2022.01)
*G06F 7/58*        (2006.01)

(52) U.S. Cl.
CPC .......... *H04L 63/1466* (2013.01); *G06F 7/584* (2013.01); *H04L 43/50* (2013.01)

(58) Field of Classification Search
CPC ...... H04L 63/1466; H04L 43/50; G06F 7/584
See application file for complete search history.

(56) References Cited

U.S. PATENT DOCUMENTS

| 10,375,192 | B1* | 8/2019 | Lepeska | .................. H04L 67/02 |
| 2006/0197702 | A1* | 9/2006 | Jones | .................. H04L 63/1466 342/126 |

(Continued)

OTHER PUBLICATIONS

Dong et al., "Detecting and Locating Man-in-the-Middle Attacks in Fixed Wireless Networks", Journal of Computing and Information Technology—CIT 23, 2015, p. 283-293 (Year: 2015).*

(Continued)

*Primary Examiner* — Catherine Thiaw
(74) *Attorney, Agent, or Firm* — Novick, Kim & Lee, PLLC; Jae Youn Kim

(57) ABSTRACT

Systems and methods are provided for detecting anomalous messages on a multipoint serial communications bus by extracting features from a first and a second message, including a time delay between the first and the second messages and, for each message, a sender address, a recipient address, a bus number, and a word count. A message transition pattern including the extracted features is generated. A probability of occurrence of the message transition pattern is determined by comparing the message transition pattern to a pattern dictionary, and the second message is determined to be anomalous when the probability is less than a predetermined threshold.

10 Claims, 8 Drawing Sheets

(56) References Cited

U.S. PATENT DOCUMENTS

| | | |
|---|---|---|
| 2006/0218636 A1 | 9/2006 | Chaum |
| 2010/0172259 A1* | 7/2010 | Aggarwal ............. H04W 12/12 |
| | | 370/252 |
| 2011/0185421 A1 | 7/2011 | Wittenstein et al. |
| 2013/0111204 A1* | 5/2013 | Gunnam ............... G06F 21/755 |
| | | 713/150 |
| 2016/0105453 A1 | 4/2016 | Xue et al. |
| 2019/0104121 A1* | 4/2019 | Khandani ........... H04L 63/0876 |

OTHER PUBLICATIONS

Moschevikin et al. "Investigations on Passive Channel Impulse Response of Ultra Wide Band Signals For Monitoring and Safety Applications", 2016, IEEE, p. 97-104 (Year: 2016).*

Herman Jalli Ng et al. "A fully-integrated 77-GHz pseudo-random noise coded Doppler radar sensor with programmable sequence generators in SiGe technology", by Ng et al., 2014, IEEE, 4 pages (Year: 2014).*

T. Chai et al. "Root mean square error (RMSE) or mean absolute error (MAE)?", Geosci. Model Dev. Discuss., 7, 1525-1534, 2014 (Year: 2014).*

Zouheir Trabelsi et al., "Malicious Sniffing Systems Detection Platform", International Symposium on Applications and the Internet, IEEE, 2004, pp. 201-207.

* cited by examiner

US 11,539,743 B2

ECHO DETECTION OF MAN-IN-THE-MIDDLE LAN ATTACKS

FIELD OF THE INVENTION

The present invention is directed to systems and methods for detecting unauthorized intrusion on a computer network, and, in particular, identification of anomalous transmissions transmitted over the network.

BACKGROUND

A Man-in-the-Middle (MitM) attack is a cyber-attack in which an attacker intercepts computer network traffic, impairing the confidentiality, integrity, and availability of the network. In an MitM attack, an attacker may eavesdrop on a communications channel between two or more endpoints, and may also manipulate and insert malicious traffic into the channel.

A MITM intrusion into a local area network (LAN) can be achieved by connecting a MITM device to a public Wi-Fi access point (for example, at a public café or airport), or by connecting the device physically to an exposed network cable or network switch. Malware may also be used to gain control of a trusted computer, which may then be exploited for MITM attacks.

After intruding into a LAN, a MITM device may intercept traffic through several known methods, such as corrupting a host's address resolution protocol (ARP) table or spoofing a domain name server (DNS). The ARP vulnerability gives an attacker the ability to spread spoofed ARP messages, causing network traffic to be routed to the MITM device. In general, solutions to MITM attacks on LANs have addressed specific flaws in a single protocol and are therefore difficult to generalize to other known or unknown attacks. Intrusion Detection Systems (IDS) have been proposed that combine both hardware and software, such as an add-on component plugged into a mirror port of a network switch. However, such solutions may not perform well against some MITM attacks, such as an active wiretap that acts as a network bridge, leaving no forensic evidence in packets that traverse it.

SUMMARY

The present invention provides a system and methods for detecting MITM intrusions into a LAN via echo-analysis. An MITM detection system emits excitation signals, receives echoed response signals, and detects anomalies in the echoed response. The method is non-intrusive, incurs a minimal network overhead, and is not dependent of the hardware and software of the LAN or the attacker's device.

In embodiments of the present invention, a system is provided having at least one processor and at least one memory storage communicatively coupled to the at least one processor on which is stored computer-readable instructions that when executed by the at least one processor cause the computing system to perform steps for detecting MITM intrusions on a local area network (LAN) having one or more trusted hosts. The steps may include:
  emitting a plurality of first echo requests onto the LAN and determining first network features from responses to the first echo requests, wherein the first network features include round trip time (RTT), impulse energy response, and jitter;
  emitting one or more second echo requests onto the LAN;
  measuring second network features from responses to the second echo requests;
  determining that the second network features are anomalous with respect to the first network features; and
  responsively issuing an MITM alert.

In some embodiments, each of the first echo requests includes packetized data and wherein the packetized data include randomly selected elements. The randomly selected elements may e selected by a pseudorandom binary sequence generator incorporating maximal linear feedback shift registers to provide a maximal length sequence signal. Determining the first and the second network features may include determining mean values of the network features.

In some embodiments, determining that the second network features are anomalous may include determining a root mean square error (RMSE) score for a difference between the first and second network features.

In further embodiments of the present invention, a computer-based method is provided for detecting Man-in-the-Middle (MITM) intrusions on a local area network (LAN), may include: emitting a plurality of first echo requests onto the LAN and determining first network features from responses to the first echo requests, wherein the first network features include round trip time (RTT), impulse energy response, and jitter; emitting one or more second echo requests onto the LAN; measuring second network features from responses to the second echo requests; determining that the second network features are anomalous with respect to the first network features; and responsively issuing an MITM alert.

BRIEF DESCRIPTION OF DRAWINGS

In the following detailed description of various embodiments, reference is made to the following drawings that form a part thereof, and in which are shown by way of illustration specific embodiments by which the invention may be practiced, wherein.

DETAILED DESCRIPTION OF THE INVENTION

Figure 1A:
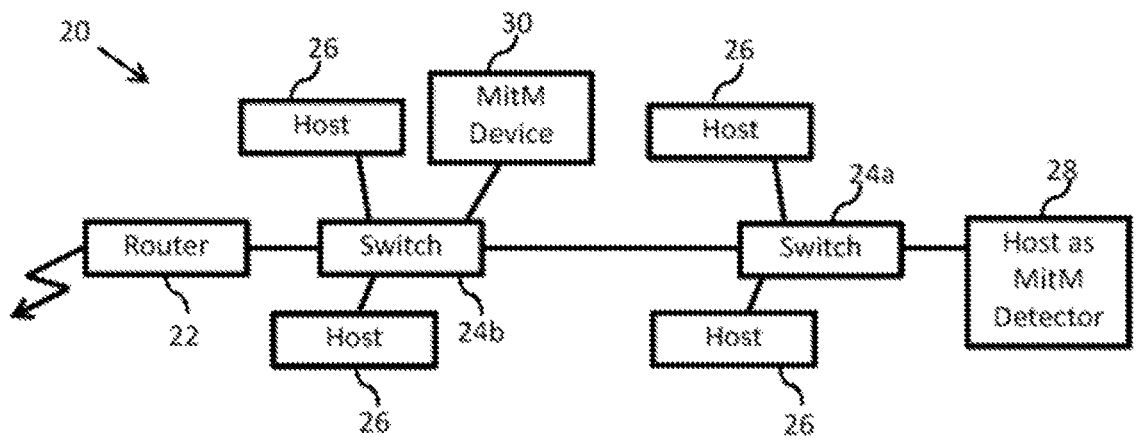
FIGS. 1A-1C are schematic illustrations of computer networks indicating alternative configurations of MitM detectors and alternative configurations of MitM attacker devices, in accordance with an embodiment of the present invention.

In the following detailed description of various embodiments, it is understood that other embodiments may be utilized and structural changes may be made without departing from the scope of the present invention.

Definitions and Mathematical Formulation

Signal: A signal is a discreet sequence of values sampled at the rate $f_s$ (measured in frequency units, typically Hz). Hereinbelow, x is an input signal where x[t] denotes the value of that signal at time index t. The signal y is an output signal where y[t] denotes the value of that signal at time index t.

Linear and time—invariant (LTI) System: An echo response system receives an input signal x and generates an output signal y. The system is linear if (1) it obeys the additivity principal, such that a mixed input signal $x[t]=x_1[t]+x_2[t]$ produces a linear output signal $y[t]=y_1[t]+y_2[t]$, and (2) it obeys the homogeneity principle, such that if an input x[t] produces an output y[t], an input ax[t] produces an output ay[t]. The echo response system is time-invariant if the output does not depend on when the input is applied.

Excitation Signal: A brief input signal, also referred to hereinbelow as a probe signal, which has been crafted so that a dynamic reaction of the environment can be identified by the output y.

Impulse Response: An impulse response signal h is an output signal generated when presented with a brief excitation signal (the Dirac delta function). The impulse signal contains all frequencies, such that an LTI system can be completely characterized by its response to an impulse signal. This means that for any input x, the output y of an LTI system can be calculated as a convolution function y[t]=h[t]*x[t].

In the domain of acoustic signal processing, a sound which reverberates through the air, and the environment (e.g., room) which reflects and affects the vibrations as they propagate, are the signal x and LTI system S respectively. An acoustic engineer can model S by extracting its impulse response h. This can be achieved by emitting an excitation signal x at one location while simultaneously recording the resulting signal y at another location.

There are several methods for generating an acoustic impulse response from an excitation signal. Direct methods involve an excitation signal x which is similar to that of a Dirac function. However, because it is impossible to generate a true Dirac Signal in an acoustic environment, short, loud sounds are used instead. Indirect methods involve de-convolving a non-Dirac excitation signal x with the resulting output signal y. One well-known excitation signal is the maximal length sequence (MLS) signal. An MLS is a pseudorandom binary sequence generated from maximal linear feedback shift registers. With m registers, the generator produces a random binary sequence of length $N=2^m-1$ which is spectrally flat. As a result, an MLS excitation signal includes all frequencies, closely resembles white noise, and is robust in noisy and populated environments. Other examples of excitation signals that could be employed are a "sine sweep" and a simple pulse.

Once an impulse response h has been extracted from S, it can be used to perform a convolution reverb (a digital simulation of an audio environment on sound).

In embodiments of the present invention, a LAN is modeled as an acoustic LTI system. Excitation signals are injected into the LAN, and the resulting echoed response signals are measured. Abnormal changes in newly sampled responses are thus detected. On a LAN, the switches, network interfaces, and operating systems all affect a packet's travel time. The hardware, buffers, caches, and even the software versions of the devices which interact with the packets, all affect packet timing.

To measure feedback regarding problems in an Internet Protocol (IP) based network, standard network messaging protocols may be used, such as synchronize and acknowledge (SYN/ACK) messaging or echo request/response messaging based on the Internet Control Message Protocol (ICMP). For example, an ICMP echo request message, or "ping" command, when sent from a local host to a target host, causes the target host to respond with an echo reply message. Upon receiving the echo reply, the sending local host can measure the round-trip-time (RTT) to and from the receiving target host. According to the ICMP standard (RFC 1122: 3.2.2.6), a payload may also be included in an echo request. In this case, the receiving host must include the same payload data in the echo reply.

The RTT of an ICMP message sent over a LAN is dependent on the number of switches (hops) traversed, because interactive networking elements (e.g., switches) must fully buffer each received frame before transmitting. The RTT is also dependent on the current load and the hardware/software implementation of each networking element along the path of the ping.

A model for estimating the RTT is as follows. The time to transfer an Ethernet frame between two network elements is denoted as $h_i(t)$, at the i'th hop at time t. Assuming the frame is B bytes long, $h_i(t)$ may be modelled as:

$$h_i(t)=\text{prop}+B(\text{trans}+\text{proc}_i(t)) \quad (1)$$

where "prop" is the propagation time on the wire (approximately the speed of light), "trans" is the transmission time for a single byte, and "proc$_i$(t)" is the average processing time per byte at the transmitting element at time t (e.g., time required for parsing and buffering).

For multiple switches between the two network elements, a one-way trip time (TT) from host i to host j can be modeled as $$TTij(t)=h_1(t)+h_2(t+h1)+\ldots+h_k(t+h_1+\ldots+h_{k-1}) \quad (2)$$

From Eq. 2 the round-trip time, RTT, between host i and host j, sent at time t, can be modeled as:

$$RTTij(t)=TTij(t)+B\cdot\text{reply}_j(t)+TTji(t)(t+TTij) \quad (3)$$

where reply$_j$(t) is the average time it takes for host j to process each byte in an ICMP echo reply, at time t.

Given the model of Eq. 3, an excitation sequence can be provided and an impulse response measured to indicate potential attacks. Let Sij be an echo response function of a LAN or a WAN, from the perspective of a local host i that communicates with a target host j. We define the input signal, x, also referred to hereinbelow as the probe signal, as a sequence of echo request frames. We may define x[n] $\in\{42, 43, \ldots, 1542\}$ as the number of bytes that are transmitted in the echo request, that is, 42 bytes for the header, for Ethernet, IPv4, or ICMP, and an additional 0-1500 bytes for the ICMP payload. An output signal y may be defined as a sequence of RTTs, computed from the respective echo reply packets' arrival times. Formally, $$y[n]=Trx[n]-Ttx[n] \quad (4)$$

where Ttx[n] is the transmission timestamp of the n-th echo request in x, and Trx[n] is the reception time of the resulting echo reply.

When random sized messages are sent back-to-back over a LAN at a fast rate, the electronics, caching mechanisms, CPU schedulers, and queuing algorithms of each network element dynamically affect the respective proc(t) and reply (t) in response to the varying load. Inserting "excitation signal" payloads, as described below, into multiple sequential echo requests causes echo reply responses to include characteristics that show the "fingerprints" of the LAN system. The k'th RTT has a dependency on the random sizes of previously transmitted ICMP requests in x. More formally, y[k]~x[1], x[2], ..., x[k]. In addition, a reduction in error can be achieved by considering the series x[1], ..., x[k] as descriptor variables of a linear regression, as opposed to just x[k].

A test of the dependency of y[k] on the rate of ICMP requests shows that the first pings are noisier than those which follow, for example, due to caching. This is another reason for sending x at a fast rate, and not as individual pings. In embodiments of the present invention, the transmission rate of x is set as $$f_s = 2/(\mu RTT^*) \qquad (5)$$

where μRTT* denotes the average RTT time of the largest ping possible (a 1542-byte Ethernet frame). This rate ensures that y captures the environment under test well, while not overloading the end-host.

In order to capture a characterization of the function Sij of a LAN, an MLS excitation signal may be used as the input signal x. The sequence may be modulated over the minimum and maximum ICMP payload sizes. For example, one possible N=7 length MLS may be s={1, 1, 1, 0, 1, 0, 0}. In this case, s may be translated into a transmission signal x={1542, 1542, 1542, 42, 1542, 42, 42}. The length of pseudorandom MLS excitations increases the momentary stress on the network, so that the output y better captures the network's characteristics in a range of conditions. In addition, because an MLS is randomly generated for each ping, a replay attack is more difficult, as described below.

The output y contains the impulse response h. In order for h to fully characterize the function Sij, Sij must be linear and time-invariant (LTI). Sij does not abide by the homogeneity principal and therefore is not strictly LTI, because RTTs are dependent on the media's propagation time ("prop" in Eq. 1). However, over a short interval, as a snapshot of the network, Sij approximates an LTI environment, and its impulse response can significantly capture the environment's characteristics at that moment. Moreover, because prop is close to the speed of light, this term is negligible with respect to the rest of the timing model in Eq. 3. Sij is time-variant because proc(t) and reply(t) are dependent on the load of the LAN and the end-host, which changes over time. Let S(t)ij be the state of Sij at time t. Let x(t) and y(t) be the respective input and output at time t. If x(t) is significantly short, then processing times of S(t)ij can be approximated as constants. Therefore, snapshots of Sij are independently time-invariant.

Nevertheless, Sij cannot be characterized with a single response to an MLS signal, but rather requires a collection of echo responses to model Sij's normal behavior By sampling the distribution of Sij's impulse responses to multiple input signals, it is possible to capture Sij's characterization over time.

Jitter is the time lapse between two consecutive packet arrivals. We denote the jitter values of the ICMP echo responses as z, defined as $$z[t] = Trx[t] - Trx[t-1] \qquad (6)$$

Three distinct levels of jitter may be identified for transitions between adjacent bits in an MLS binary sequence. For instance, whenever a '10' appears in the sequence, the jitter is small, because the RTT of a 42-byte packet ('0') is shorter than that of a 1542-byte packet ('1'). When the pings are sent at a rate offs, the response for the '0' arrives shortly after the response for the '1'. By contrast, a response to a '1' will arrive significantly later after a '0'. Therefore, z captures additional characteristics of the channel between devices i and j, such as additional processing delays and moments of stress on the participating network elements.

MitM Detector

An MitM detector provided by the present invention captures an "impulse response" of a local area network (LAN) by transmitting a probe signal, to a target host on the LAN. In embodiments of the present invention, the probe signal may be a short "burst" of Internet Control Message Protocol (ICMP) echo request messages, commonly referred to as "pings". For example, a burst may consist of 50 pings. Alternatively, depending on the communications protocols implemented by devices on the LAN, other messaging protocols may be used to such as the SYN/ACK protocol mentioned above.

The "impulse response" from the target host, that is, the sequence of echo responses from the target host, is analyzed to determine features of the network, which serve as a "base-line" of normal behavior of the network from the perspective of the two communicating devices, that is, between the MitM detector and the target host. If subsequently an MitM attacker device is inserted into the network and intercepts traffic, the harmonic composition of the impulse response changes significantly. The MitM detector may detect this change using an auto-encoder neural network configured as an anomaly detector, as described further hereinbelow. Alternative methods of anomaly detection may also be used, such as the "Local Outlier Factor" (LOF) algorithm, or other machine learning methods for clustering.

An MitM attack may be implemented by different methods that may be differentiated by their network topology, as follows:

End-Point Traffic Diversion (EP-TD) MitM. An MitM attacker device (also referred to hereinbelow as an "MitM" or "MitM device") may be configured as a new host on the network. Alternatively, an existing host may be compromised to execute MitM attacking software. The new or compromised host can then cause the traffic in transit between two other hosts to flow to the new or compromised host (e.g., via ARP poisoning or some other protocol-based MitM attack).

In-Line Network Bridge (IL-NB) MitM. An MitM device may be inserted into the network, in-line with a network cable, bridging all traffic from one side of the network to the other, while manipulating and/or injecting traffic.

In-Line Dedicated Hardware (IL-DH) MitM. An MitM hardware device may be inserted into the network, in-line with a network cable, and acting as a switch for all traffic from one side of the network to the other, while manipulating and/or injecting traffic.

In-Point (IP) MitM. An MitM device may be configured as a switch, replacing a switch with dedicated hardware (DH) or compromising an existing switch, and performing networking switching functions while also manipulating and/or injecting traffic.

The types of MitM attacks described above target the data link layer of the OSI model. It should be noted that an MitM attacker device may have the same software as a target host on a network, and may simply respond to a request on behalf of the target host. In this case, an impulse response generated by the attacker may be the same as that generated by the target host. However, small differences in the hardware of the target host and the MitM attacker may be sufficient to differentiate between the impulse responses. Typically, an MitM attacker device will buffer every inbound packet. This is to avoid signal collisions on the media when transmitting altered packets, and to capture and alter relevant packets before they reach their intended destination. For the latter reason, the MitM attacker device must parse every frame in order to determine the frame's relevancy to the attack, and cannot retroactively stop a transmitted frame. Therefore, the interception process (hardware and/or software) will affect the timing of network traffic.

Figure 1B:
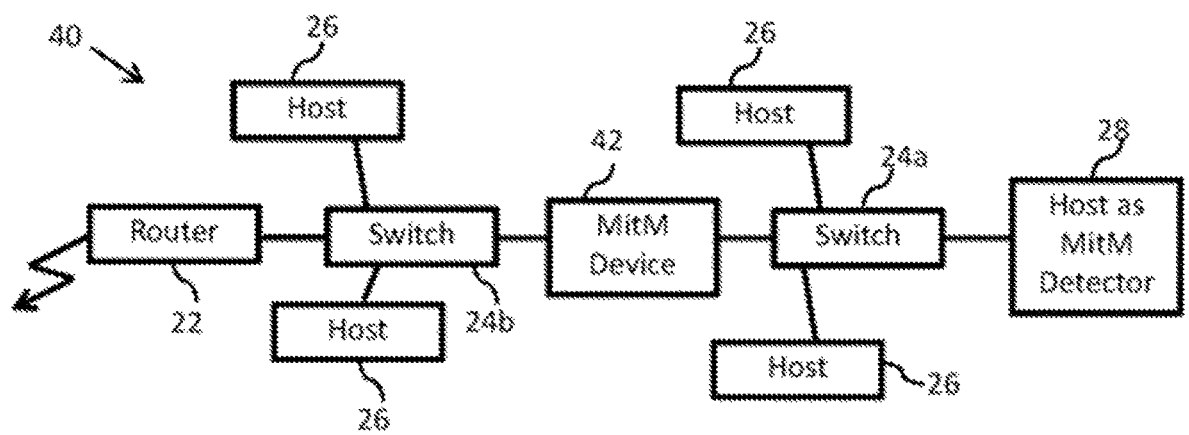
Figure 1C:
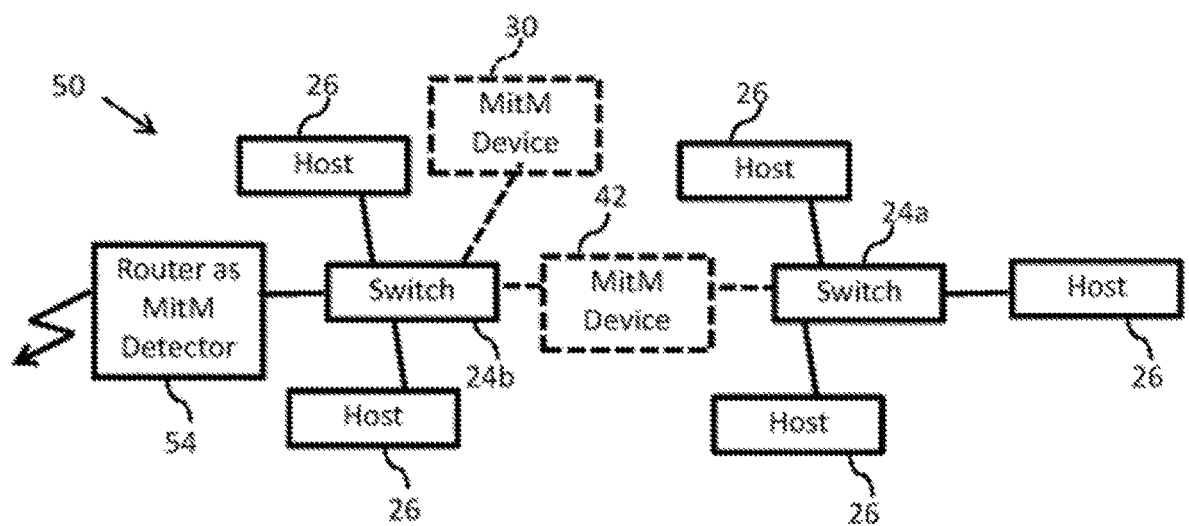

FIGS. 1A-1C are schematic illustrations of computer networks indicating several possible LAN configurations of MitM detectors and of MitM attacker devices, in accordance with an embodiment of the present invention.

FIG. 1A is an illustration of a network 20, connected to external networks by a router 22 and having multiple switches 24a and 24b to which are attached multiple devices, indicated as hosts 26. An MitM detector 28 is indicated as attached to the switch 24a. The MitM detector 28 is typically a computer system, that is, a host, running MitM detector software described further hereinbelow. Alternatively, the MitM detector 28 may be configured as a hardware-based implementation of such a host with MitM detector software. In some embodiments, multiple MitM detectors may be configured to operate on a network, in order to better characterize communications throughout a network, so as to better identify anomalous network communications that may indicate a presence of an MitM attacker.

FIG. 1A shows an MitM attacker device 30 connected to switch 24b, as an end-point traffic diversion (EP-TD) MitM. For an attack by MitM attacker device 30 to be effective, switch 24b must also be compromised by the attacker to cause traffic in transit between two other hosts to be rerouted to flow to the MitM attacker device 30 (e.g., via ARP poisoning or some other protocol-based MitM attack). Attacks by the MitM attacker device 30 are also referred to hereinbelow as "Classic MitM" attacks.

FIG. 1B is an illustration of a network 40 that indicates an alternative configuration of an MitM attacker device. Other network elements may be identical to those illustrated in network 20: the router 22, the multiple switches 24a and 24b, the multiple hosts 26, and the MitM detector 28 attached to one of the switches. In the network 30 an MitM attacker device 42 has been connected in-line between switch 24a and switch 24b as an in-line MitM. The MitM attacker device 42 may be a modified network bridge or dedicated hardware. Alternatively, the MitM attacker device 42 may be an in-point MitM, as described above, that is, a device such as a switch that typically bridges two parts of the network, but which has been compromised to perform malicious MitM operations. Regardless of whether the attacker device is "in-point" or "in-line", the attacking device is able to intercept traffic without rerouting traffic. Attacks by the MitM attacker device 42 are also referred to hereinbelow as "Active MitM" attacks.

FIG. 1C is an illustration of a network 50 that indicates an alternative configuration of an MitM detector. As opposed to the networks 20 and 40 described above, in which the MitM detectors were configured as end-point devices, the network 50 includes an MitM detector 54 that is configured as a LAN router, transmitting and receiving communications to an external network. In such a configuration, the MitM detector may, for example, communicate with directly connected routers on other LANs, so as to detect a presence of MitM attacking devices over a wide-area network (WAN).

Figure 2:
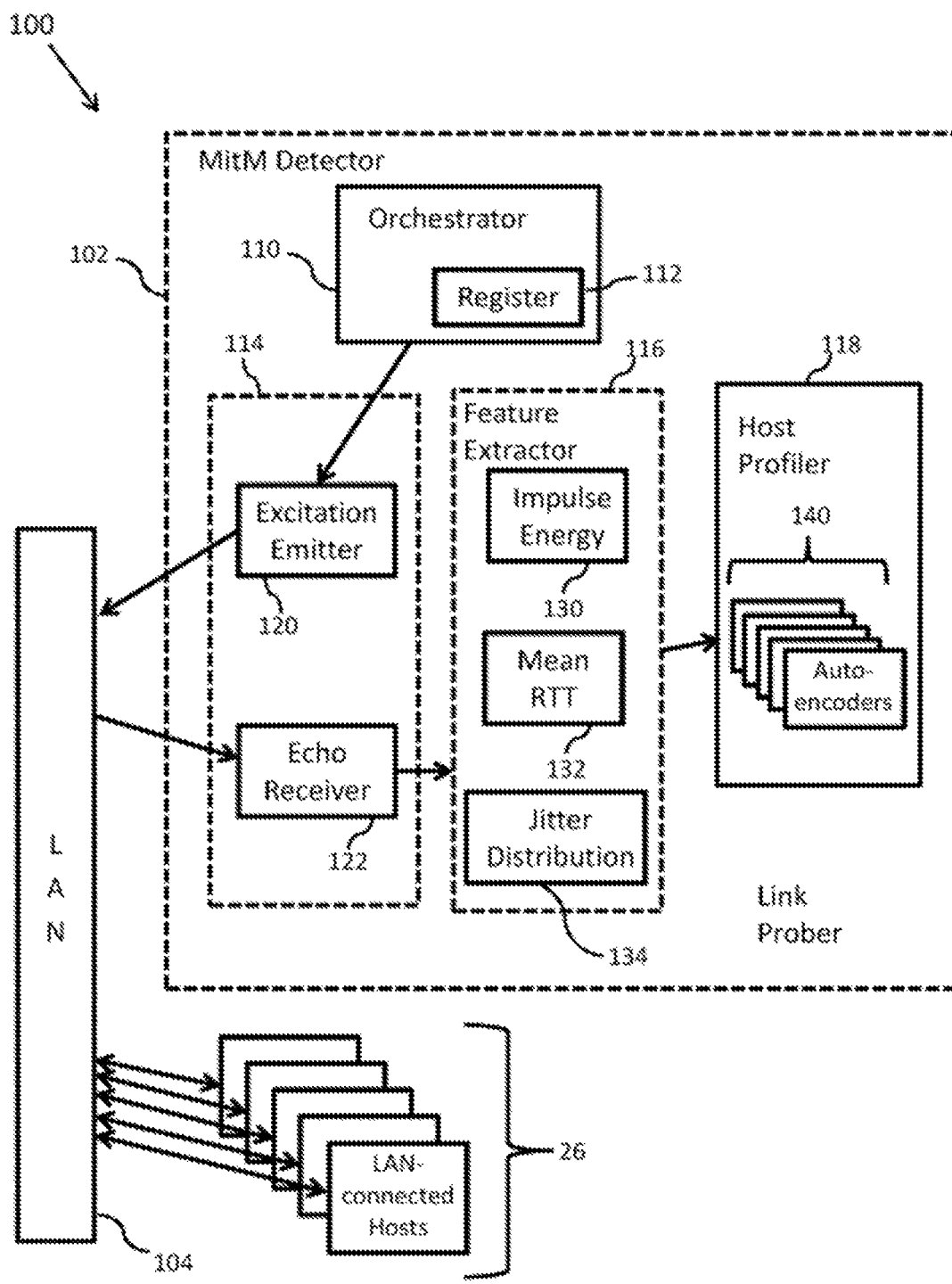
FIG. 2 is a schematic illustration of a computer network including an MitM detector, in accordance with an embodiment of the present invention.

FIG. 2 is an illustration of a network 100 including an MitM detector 102 operating on a LAN 104, according to an embodiment of the present invention. As described above, the MitM detector 102 is generally a general-purpose computer system or a dedicated computing device, software modules as described below and hardware drivers to communicate with other LAN-connected devices, referred to hereinbelow as hosts 106.

The MitM detector 102 typically includes four main modules. These modules, which typical execute on the one or more processors of the MitM detector 102, are: an Orchestrator (OR) 110, a Link Prober (LP) 114, a Feature Extractor (FE) 116, and a Host Profiler (HP) 118.

The Orchestrator 110 may be configured to manage a host register 112, which is a memory storage (such as a file or database) to which the Orchestrator 110 records all the identified hosts 26. Typically, the Orchestrator 110 also determines an order for probing the hosts 106.

An Excitation Emitter 120 of the Link Prober 114 probes a host selected by the Orchestrator 110 by producing an MLS excitation signal (x), typically in the form of an ICMP echo request as described above, addressed to the selected host. The Excitation Emitter 120 typically includes two sub-modules, an MLS generator, which produces an MLS sequence that will be the payload of an echo request, and an MLS modulator, which creates the echo request command including the payload. For alternative forms of communications, these sub-modules may be reconfigured accordingly to support alternative protocols.

After the Excitation Emitter 120 emits the probe signal, an echo response signal (y), typically in the form of an ICMP echo reply, is sent over the LAN 104 from the target host and received by an echo Receiver 122 of the Link Prober 114. The echo Receiver 112 performs a function referred to hereinbelow as MLS demodulation, to provide a demodulated response signal to the Feature Extractor 116.

The Feature Extractor 116 extracts a feature vector V from the demodulated response signal. The feature vector typically includes three parameters, representing three characteristics of the response signal, a measure of impulse response energy ($v_{E_h}$), a measure of mean round trip time ($v_{rtt}{*}$) and a measure of jitter distribution ($v_{jit}$). The three parameters are typically measured by three respective functions, or "extractors": an impulse energy function 130, a mean energy function 132, and a jitter distribution measurement 134.

As noted above, the impulse response, h[t] of a network is related to a driving signal and an output response function, according to the following equation, where * is the convolution operator:

$$y[t]=h[t]*x[t] \quad (7)$$

The deconvolution impulse response function may be written as:

$$h[t]=F^{-1}\{Y/X\} \quad (8)$$

where $F^{-1}$ is the inverse of the discrete Fourier transform (DFT).

By Parseval's theorem, the impulse response energy can be calculated from the above equation as $$v_{E_h} = \frac{1}{N} \sum_{k=1}^{N} \left|\frac{Y[k]}{X[k]}\right|^2 \quad (9)$$

Figure 3A:
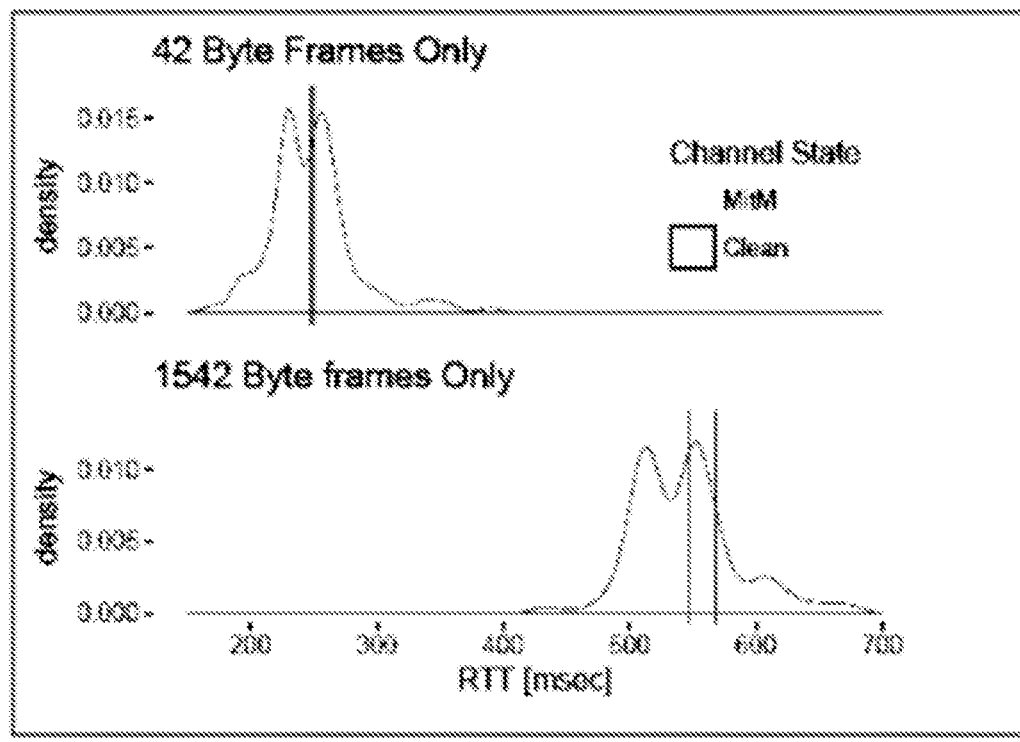
FIGS. 3A-3B are illustrative graphs of features of response signals, received by an MitM detector in response to a probe signal, in accordance with an embodiment of the present invention.

For the mean round-trip-time (RTT), the feature characteristic $v_{rtt}^*$ may be calculated by averaging the delay times (RTTs) of the response signals y. Approximately 50% of the packets in x have the maximum length of 1542 bytes. By averaging the RTTs of those frames only, we obtain a better separation between benign and the malicious scenarios. The average is extracted from each y by the Feature Extractor, and used as the feature $v_{rtt}^*$ in V. FIG. 3A shows a graph comparing distribution of RTT of response signals on a "clean" network (i.e., a network without an MitM device) to the distribution on a network with an MitM device.

For jitter distribution, the feature characteristic $v_{jit}$ may be calculated as a log-likelihood distribution of the jitter of the echo reply packets (z). Because x is transmitted at a rate of $f_s$, it can be expected that some response packets may be queued, and then transmitted back-to-back. This dynamic behavior characterizes the network's elements, and therefore can be used to "fingerprint" a connection between the MitM detector and a host j.

To detect abnormalities in this distribution, the FE performs a two-sample Kolmogorov-Smirnov (KS) test. The KS test is a nonparametric statistical test which results in a probability value (p-value) that indicates how likely two sample distributions come from the same distribution. We denote this value as $p_{X,Y}$, where X and Y are tested distributions.

The KS Tester stores m samples of host j's jitter distributions. These samples are used as references for the channel's expected behavior. We denote host j's references as the set $Zj=z_1, z_2, \ldots, z_m$. The parameter m may be tuned and a value of 5 is typical.

Let $z_0$ denote the jitter distribution given to the FE for feature extraction. With $z_0$, the KS Tester computes the value $$p_{jit} = \log[\max\{p_{z0,z1}, p_{z0,z2}, \ldots, p_{z0,zm}\}] \tag{10}$$

Figure 3B:
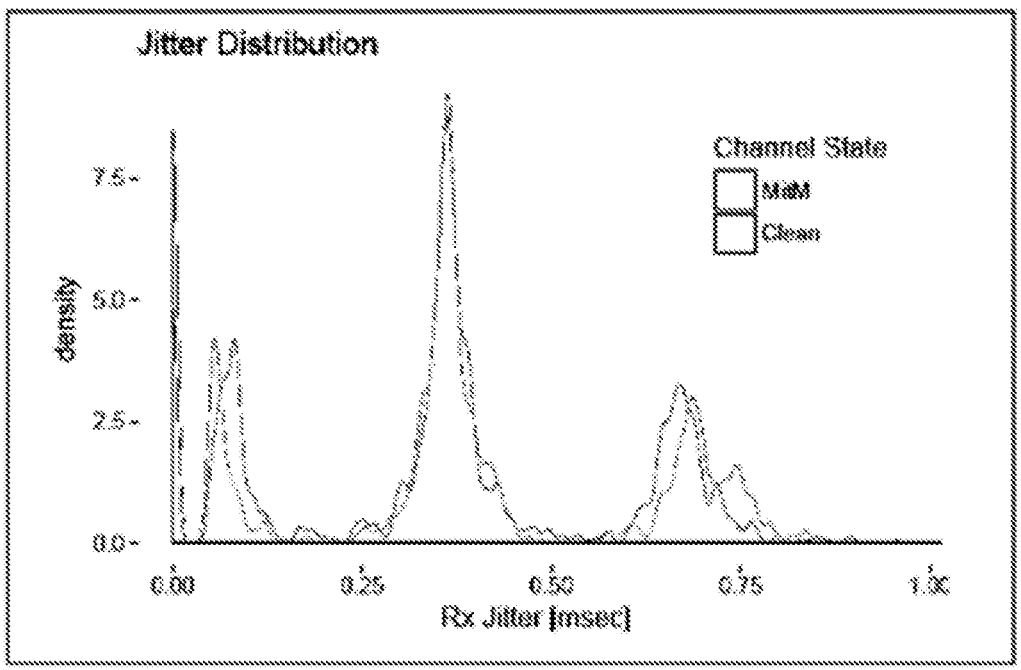

The last k computations of $p_{jit}$ (from previous probes) are averaged to form the feature $v_{jit}$. In practice, k=15 has been shown to produce good results. If $v_{jit} \sim 0$, then the KS Tester may be configured to randomly determine whether or not to update Zj with $z_0$. In (10), we take the maximum p-value, since this makes the feature more robust against false positives. FIG. 3B shows a graph comparing distribution of response signal jitter on a "clean" network (i.e., a network without an MitM attacker device) to the distribution on a network with an MitM device.

Returning to FIG. 2, the Host Profiler (HP) 118 may detect a presence of an MitM attacker device by comparing a feature vector of an echo response with an output of an appropriate auto-encoder of a set of auto-encoders 140. Each auto-encoder is trained to recognize a normal behavior of communications between the MitM detector 102 and a target host, the normal behavior being described by the extracted response features. If features of a new response are different from those generated by the auto-encoders, the host profiler raises an alert that there is an anomaly.

The auto-encoders 140 are neural networks trained to reconstruct input signals. Alternatively, the auto-encoders 140 may be other forms of behavior models generated by machine learning techniques, as described further hereinbelow. During training, an auto-encoder is trained to "learn" the function:

$$h_\theta(\vec{x}) \approx \vec{x} \tag{11}$$

where θ represents the learned parameters of the neural network, and $\vec{x} \in \mathbb{R}_n$ is an instance (observation). In embodiments of the present invention, $\vec{x}$ is the feature vector $\vec{v}$, which has three dimensions.

Auto-encoders are trained to learn the identity function of the original data distribution. Constraints are placed on the neural network, to force the auto-encoders to learn meaningful concepts and relationships between the features in $\vec{x}$. The most common constraint is to limit the number of neurons in the inner layers of the network. The narrow passage causes the network to learn compact encodings and decodings of the input instances. If an instance does not belong to the learned concepts, then we expect the reconstruction to have a high error. The reconstruction error can be computed by taking the root mean squared error (RMSE) between the input $\vec{x}$ and the reconstructed output $\vec{y}$. The RMSE between two vectors is defined as:

$$r_{\vec{x},\vec{y}} = \sqrt{\frac{\sum_{i=1}^{n}(x_i - y_i)^2}{n}} \tag{12}$$

where n is the dimensionality of the input vectors.

In order to determine whether or not a new observation, $\vec{x}$ is an anomaly, a cut-off probability $p_{thr}$ may be set and a test performed as to whether $p(X > r_{\vec{x},\vec{y}})$ is less than the threshold probability par, assuming that $X \sim N(\mu_r, \sigma_r)$, where $\mu_r$ and $\sigma_r$ are sample statistics taken from the benign instances' RMSEs.

Training auto-encoders is one method of training the Host Profile 118 to recognize anomalous responses. As described above, other methods may include, for example, a "Local Outlier Factor" algorithm, or other machine learning methods for clustering.

Figure 4A:
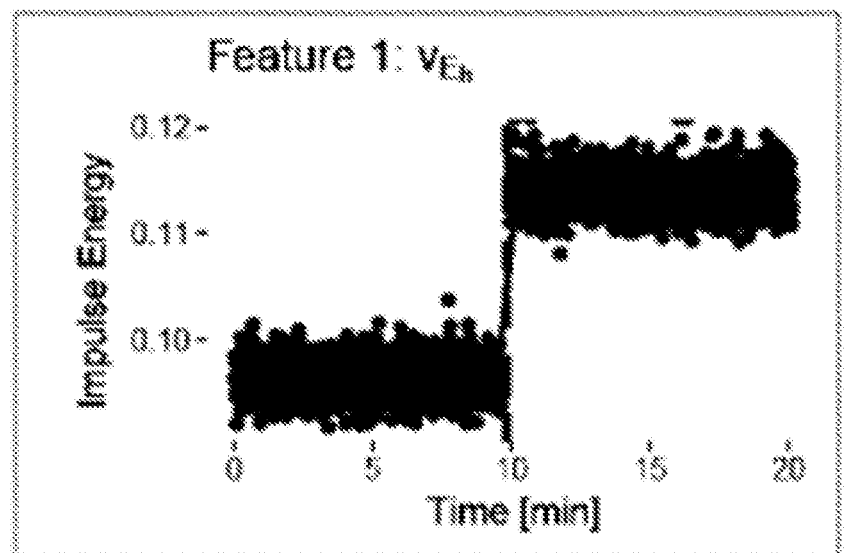
FIGS. 4A-4C are illustrative graphs of features of response signals, received by an MitM detector in response to a probe signal, before and after the addition of an MitM attacker device, in accordance with an embodiment of the present invention.
Figure 4B:
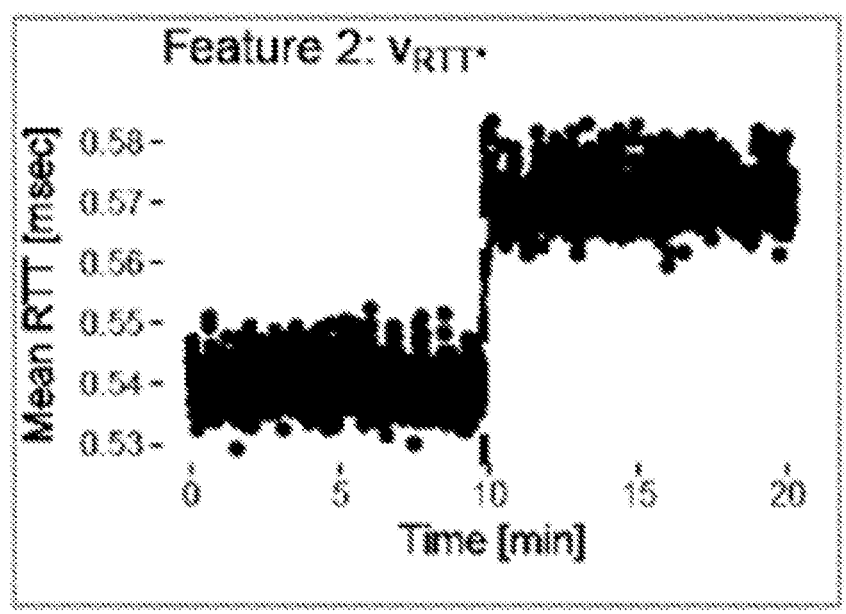
Figure 4C:
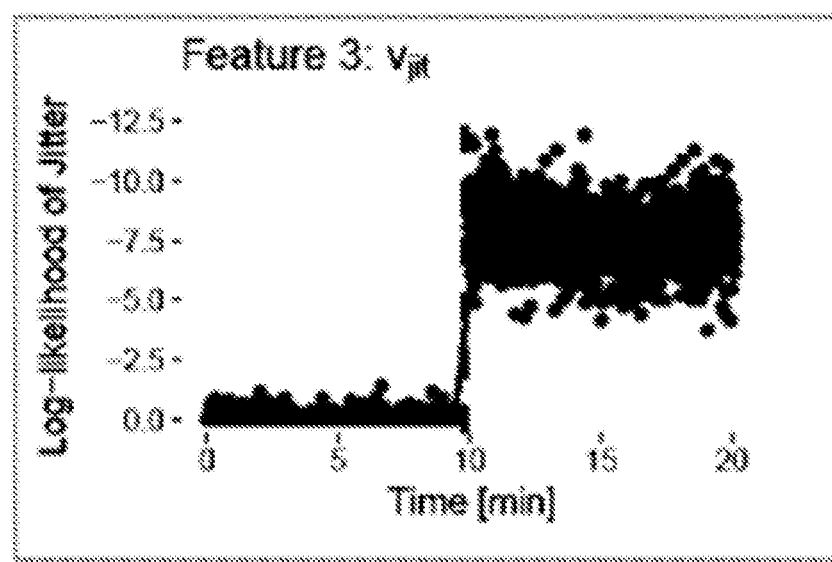

FIGS. 4A-4C are graphs indicating changes that occur in measurements of the three feature characteristics when an MitM device is added to a network (at a time indicated as 10 minutes). FIG. 4A shows that impulse energy increases with introduction of the MitM device. Similarly, FIG. 4B shows that the mean RTT increases, and FIG. 4C shows that the jitter distribution increases. The graphs show that all three computed features-energy, RTT, and jitter—are affected by the MiTM's active inspection of packets.

Figure 5:
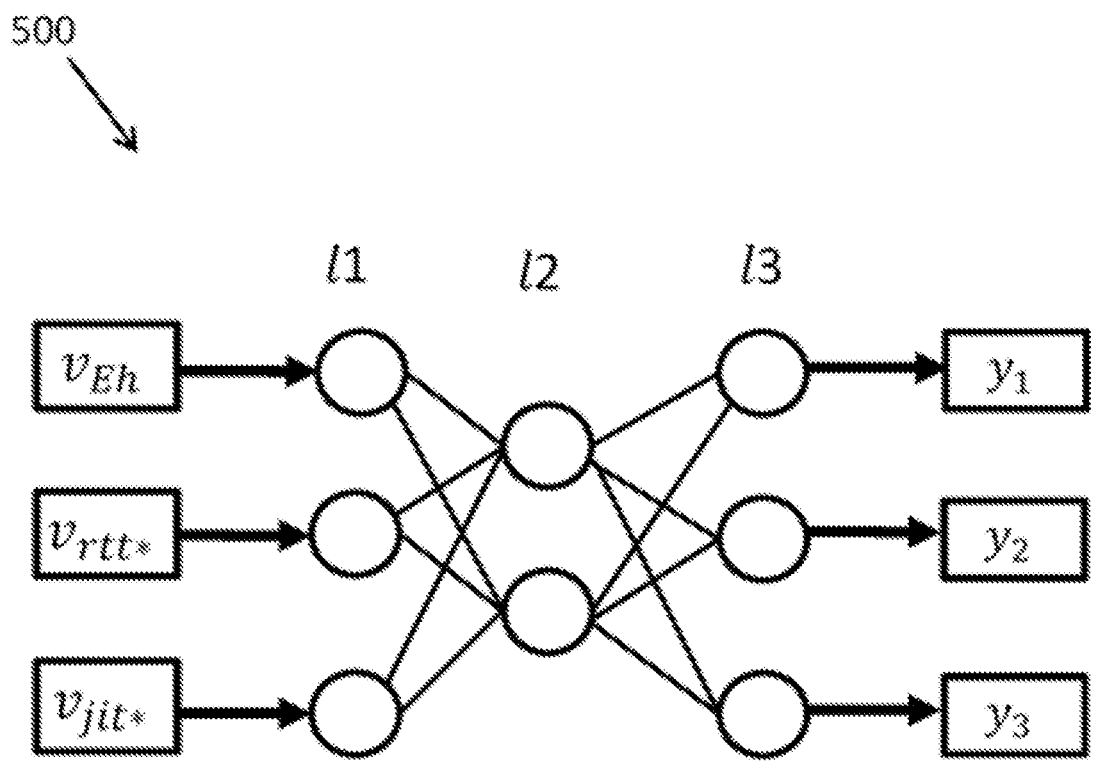
FIG. 5 is a schematic illustration of a neural network programmed as an auto-encoder of an MitM detector, in accordance with an embodiment of the present invention.

FIG. 5 is an illustration of a neural network 500 that forms an auto-encoder used by the HP, which reconstructs the feature vector with the three feature characteristics of a response signal as described above. Typically, a three-layer auto-encoder is used by the HP. The auto-encoder receives a 3 dimensional vector $\vec{v}$ at layer $l_{(1)}$, encodes (compresses) the vector at layer $l_{(2)}$, and decodes the compressed representation of the vector at layer $l_{(3)}$.

Figure 6:
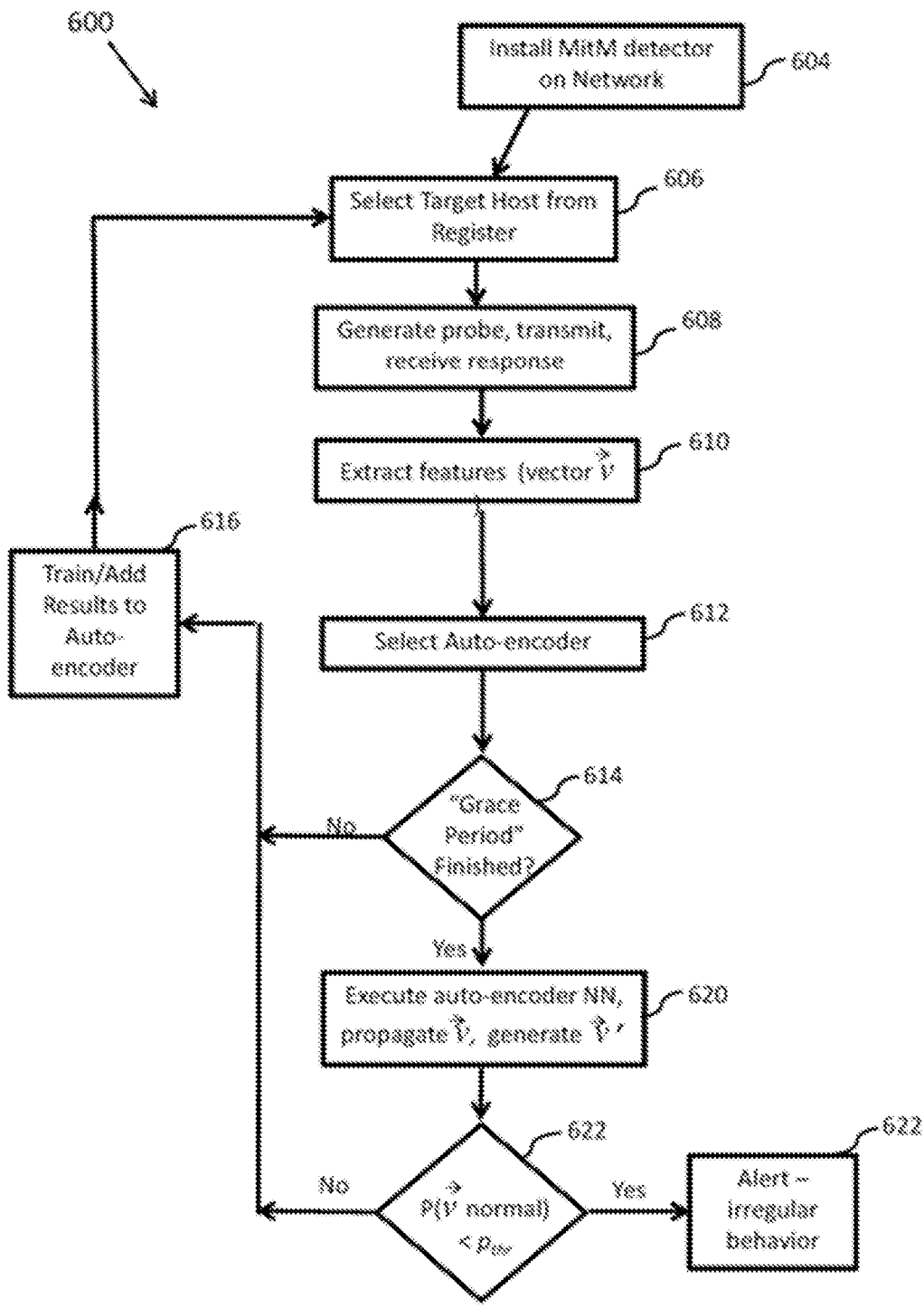
FIG. 6 is a flowchart of operation of an MitM detector, in accordance with an embodiment of the present invention.

FIG. 6 is a flowchart of a process 600 of training an auto-encoder of an MitM detector and validating an observation of network response, in accordance with an embodiment of the present invention.

At an initial step 604, an MitM detector is installed on a LAN, typically by a network administrator. The administrator may also initialize the register 112 to include IP addresses of hosts installed on the LAN. At the time of installation, the network is assumed to be free of MitM attacker devices, that is, "benign" or "clean". Subsequently, the Orchestrator 110 of the MitM detector may detect new network-attached hosts by monitoring IP addresses specified in network traffic. Before adding the new hosts to the register 112, the Orchestrator 110 may ping the new host. If the ping does not traverse a router, which may be determined according to the time to live (TTL) field of the IPv4 header, then the new host (typically defined by its IP address) is added to the register 112. In some embodiments, after identifying a new host, the Orchestrator 110 may instruct the Host Profiler 116 to clear prior auto-encoders (that is, the previously trained behavior models), as the network response with a new host may change.

At a step 606, typically at a random time (but generally within a second of adding a new host or of a previous probe transmission), the Orchestrator 110 begins a new network test by selecting a target host from the register 112.

At a step 608, the Link Prober generates a network probe, e.g., a set of echo request pings, and transmits the set to the selected, target host, subsequently receiving the corresponding set of echo reply messages from the target host. That is, the echo Receiver 122 of the Link Prober 114, receives the echo reply packets in response to the echo request pings.

At a step 610, the Feature Extractor 116 determines a feature vector V, as described above.

At a step 612, the Host Profiler selects the auto-encoder defined for the target host.

At a decision step 614, the Host Profiler determines whether a "grace period" has passed since the network was last changed. The primary stage of training is performed during the grace period. The grace period is typically predefined, that is, set before the MitM detector beings operation. The grace period is generally set as an amount of time sufficient for auto-encoders to be trained for all recognized hosts on the network. Depending on the size of the network, this may be several seconds.

If the grace period is not finished, then at a step 616, the feature vector is applied to the selected auto-encoder, typically by the neural network process of "back-propagation", incrementally optimized using the Stochastic Gradient Descent (SGD) algorithm.

If the grace period has finished, then at a step 620 the auto-encoder is executed by propagating feature vector $\vec{v}$ to generate a reconstruction vector $\vec{v}'$. The reconstruction error can be computed by taking a root mean squared error (RMSE) between the input $\vec{v}$ and the reconstructed output $\vec{v}'$. If the RMSE is less than a predefined error threshold, as described above, then the new feature vector $\vec{v}$ is applied to the auto-encoder at the training step 616 to improve the auto-encoder. If the error is greater than the threshold, then at a step 622 an MitM alert is issued, notifying the network administration of the potential of an MitM attack.

If an alert is not generated, then the MitM detector, after step 616, begins the testing and training process again at step 606.

An MitM attacker device may try to evade detection with three methods:

Denial of Service (DoS): The MitM attacker device causes echo request packets to be dropped, so that the target host does not receive them.

Spoofing: The MitM attacker device responds to echo request packets, rather than allowing their delivery to the target host.

Replay: The MitM attacker device responds to echo request packets with previously recording responses from the target host.

The different features acquired by the Feature Extractor have different levels of accuracy in detecting the three types of evasive actions. The average RTT feature, for example, is effective in identifying an active MitM spoof (in-line, or in-point), because the intercepting MitM attacking device typically will not respond in the same time as the target host. However, the average RTT will not be as greatly affected by a classic MitM attacking device (an end point device that receives redirected transmissions), so the average RTT feature will not be as effective for such a scenario. The impulse response feature, however, is effective in identifying replay attacks, because the MLS sequence is difficult to predict in real time. The impulse response is also effective in identifying active attacks, because the impulse response is highly dependent on the placement of the attacker device.

The jitter feature, $v_{jit}$ is a good indicator of a spoof attack because the distribution of the jitter signal acts as a good fingerprint of the target host's processing behaviors. However, $v_{jit}$ is very a poor indicator of replay attacks because the feature is not dependent on the uniqueness of the MLS signal.

All features are strong indicators of a DoS attack because in the event of a loss-of-signal, a time-out occurs, causing a spike in all the features' values, thus leading to an alert.

Machine learning techniques can develop implicit or explicit models that categorize patterns in a data set. Machine learning algorithms for anomaly detection may include classification, or "clustering" algorithms, including Bayesian networks and Markov models. The process may also include setting an "anomaly threshold" for each separate feature measured in transmissions. Devices performing processing tasks of the MitM detector 102 and of process 600 and of other derived embodiments of the present invention may be implemented by a processor, meaning any one or more microprocessors, central processing units (CPUs), computing devices, microcontrollers, digital signal processors, FPGA or like devices. Data storage media, or computer-readable media, may refer to any medium that participates in providing data (e.g., instructions) that may be read by a processor. Such a medium may take many forms, including but not limited to, non-volatile media, volatile media, and transmission media. Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G. Formats described for storing data, such as data dictionaries and databases, may include other formats, including tables, relational databases, object-based models and/or distributed databases. In addition, the data may be stored locally or remotely from a device which accesses the data. Software may be tangibly embodied in an information carrier, such as a machine-readable storage device or in a propagated signal, for execution by, or to control the operation of, data processing apparatus, such as a programmable processor or computer, or deployed to be executed on multiple computers at one site or distributed across multiple sites. Memory storage may include multiple distributed memory units, including one or more types of storage media including magnetic media, optical media, and integrated circuits such as read-only memory devices (ROM) and random access memory (RAM). Network interface modules may control the sending and receiving of data packets over networks. Method steps associated with the system and process can be rearranged and/or one or more such steps can be omitted to achieve the same, or similar, results to those described herein. It is to be understood that the embodiments described hereinabove are cited by way of example, and that the present invention is not limited to what has been particularly shown and described hereinabove. Rather, the scope of the present invention includes variations and modifications thereof which would occur to persons skilled in the art upon reading the foregoing description and which are not disclosed in the prior art. Changes and modifications, which do not depart from the teachings of the present invention, will be evident to those skilled in the art. Such changes and modifications are within the purview of the present invention and the appended claims.

The invention claimed is:

1. A computing system for detecting Man-in-the-Middle (MITM) intrusions on a local area network (LAN), comprising at least one processor and at least one memory storage communicatively coupled to the at least one processor on which is stored computer-readable instructions that when executed by the at least one processor cause the computing system to perform steps including:

during a first period of network operation, emitting a plurality of first echo excitation signals onto the LAN, each first excitation signal x being a sequence of echo requests;

determining, for each first excitation signal, a respective output sequence y of round-trip times (RTTs) and responsively determining, for each first excitation signal, a vector of first network features, wherein the first network features include a mean RTT, a measure of impulse response energy, and a measure of jitter distribution, wherein a value of impulse response energy is calculated as an inverse discrete Fourier transform (DFT) of a ratio of discrete Fourier transforms of the excitation signal x and the output sequence y;

generating from the plurality of vectors of the first network features corresponding to the first excitation signals, a behavior model characterizing a first period operation;

subsequently emitting one or more second excitation signals of sequences of echo requests onto the LAN;

measuring respective vectors of second network features from responses to the second echo excitation signals;

determining, according to the behavior model characterizing the first period operation, that the vectors of the second network features are anomalous with respect to the vectors of the first network features; and responsively issuing an MITM alert.

2. The system of claim 1, wherein packet sizes of the echo requests of each of the first and second excitation signals are randomly set to either a maximum or a minimum echo request packet size.

3. The system of claim 2, wherein the randomly set packet sizes are selected by a pseudorandom binary sequence generator incorporating maximal linear feedback shift registers to provide a maximal length sequence signal.

4. The system of claim 1, wherein the impulse response energy is calculated for each excitation signal as:

$$\frac{1}{N}\sum_{k=1}^{N}\left|\frac{Y[k]}{X[k]}\right|^2,$$

wherein functions X and Y are respectively discrete Fourier transforms of the excitation signal x and the output signal y.

5. The system of claim 1, wherein generating the behavior model characterizing the first period operation comprises applying one or more of a neural network auto-encoder, a "local outlier factor" algorithm, or a machine-learning clustering model, to the first network feature vectors.

6. A computer-based method for detecting Man-in-the-Middle (MITM) intrusions on a local area network (LAN), comprising:

during a first period of network operation, emitting a plurality of first excitation signals onto the LAN, each first excitation signal x being a sequence of echo requests;

determining, for each first excitation signal, a respective output sequence y of round-trip times (RTTs) and responsively determining, for each first excitation signal, a vector of first network features, wherein the first network features include a mean RTT, a measure of impulse response energy, and a measure of jitter distribution, wherein a value of impulse response energy is calculated as an inverse discrete Fourier transform (DFT) of a ratio of discrete Fourier transforms of the excitation signal x and the output sequence y;

generating from the plurality of vectors of the first network features corresponding to the first excitation signals, a behavior model characterizing a first period operation;

subsequently emitting one or more second excitation signals of sequences of echo requests onto the LAN;

measuring respective vectors of second network features from responses to the second excitation signals;

determining, according to the behavior model characterizing the first period operation, that the vectors of the second network features are anomalous with respect to the vectors of the first network features; and responsively issuing an MITM alert.

7. The method of claim 6, wherein packet sizes of the echo requests of each of the first and second excitation signals are randomly set to either a maximum or a minimum echo request packet size.

8. The method of claim 7, wherein the randomly set packet sizes are selected by a pseudorandom binary sequence generator incorporating maximal linear feedback shift registers to provide a maximal length sequence signal.

9. The method of claim 6, wherein the impulse response energy is calculated for each excitation signal as:

wherein functions X and Y are respectively discrete Fourier transforms of the excitation signal x and the output signal y.

10. The method of claim 6, wherein generating the behavior model characterizing the first period operation comprises applying one or more of a neural network auto-encoder, a "local outlier factor" algorithm, or a machine-learning clustering model to the first network feature vectors.

* * * * *